United States Patent Office
3,374,704
Patented Mar. 26, 1968

3,374,704
LINEAR CALIBRATING INTERFEROMETER
Millard S. Granger, Hillcrest, Binghamton, N.Y., assignor to General Electric Company, a corporation of New York
Filed May 26, 1964, Ser. No. 370,302
4 Claims. (Cl. 88—14)

ABSTRACT OF THE DISCLOSURE

A precision instrument for measurement of minute linear displacements by use of an interferometer which generates linear interference fringes, movement of which through a complete cycle indicates a displacement of λ/2 of the light used in the interferometer. The instrument has a rod shaped anvil one end of which is used to sense the displacement to be measured, the other to drive one of two optical surfaces of the interferometer. The anvil is supported so as to permit only linear displacement of the anvil along its length. The anvil is mounted axially of a cylindrical drum mounted on the base with the anvil extending through both drum heads. The drum is inflexible, the heads elastic, metallic sheets limiting movement of the anvil to longitudinal movement.

---

This invention relates to an instrument for making precision measurements of lineal displacements. It is particularly useful for calibrating indicating gages with an accuracy of 1–10 microinches.

Many measuring techniques require the use of indicating gages which measure in the 0–100 microinch range. The standard reference for production processes has been the gage block. A set of gage blocks provides reference dimensions by being stacked so that the accumulated thicknesses equal to the desired dimension. Typically, a set of blocks permits selection of dimensions from a fraction of an inch to a foot in increments of 100 microinches, and sometimes in increments of 25 microinches. In calibrating indicating gages in microinches, these increments are too large to assure calibration of better than about 10 microinches under the best of conditions. There are numerous sources of possible error including dirt and air between blocks and temperature variations.

New gage blocks are guaranteed to be accurate within several microinches at 68° F. The blocks themselves are manufactured with an interferometer reference. This introduces the ultimate reference for lineal dimensions, the wavelength of light. However, the wavelengths of visible light are in the range of about 15–25 microinches and therefore even with direct reference to light, measurement in microinches means interpolation. Introducing an intermediate instrument in making measurements can be generally expected to lose one significant digit in accuracy so that gage blocks or any other instrumentality without direct reference to light wavelengths is unpromising for measuring displacements in microinches.

Calibration of a measuring instrument such as an indicating gage involves a physical comparison. When one quantity is a wavelength of light and the other a mechanical displacement to which a sensor responds, transformation of the optical and/or mechanical quantity to compatible units is difficult. For example, if an indicating gage is calibrated by comparing the gage readings on gage block stacks, which are previously compared with an optical flat, it is necessary to rely on the surfaces supporting the separate gage block stacks and the indicating gage to be optically flat surfaces.

In contemplating an interferometer based calibrating instrument, two critical problem areas are the integrity of the mechanical structure and integration of the gage sensor with the interferometer optical elements whereby the observed optical effect reliably represents the actual indicating gage operation. Considering the structure of a Michelson interferometer, for example, operation is dependent upon a plurality of elements arranged in a plane and supported by a frame. Accuracy is dependent upon the structural integrity in three dimensions which are subject to variation with temperature and stress changes. The interferometer provides a variably displaced plane mirror the displacement of which can be accurately determined in terms of wavelengths of light, but it is difficult to operate the interferometer to relate the mirror movement to gage readings. Also, the ringed interference pattern produced requires skilled interpretation and manipulation. For reasons such as these, interferometers have not been found satisfactory for day to day reference instruments.

Accordingly, it is an object of the invention to provide a practical interferometer-based instrument for calibrating indicating gages.

It is a further object of the invention to provide an instrument for measuring lineal displacements in microinches with direct reference to light wavelengths which has inherent structural stability.

Another object of the invention is to provide a precision instrument for measuring lineal displacements in microinches in which the instrument displacements are readily related to the displacements being measured and the instrument readings are easily made.

Briefly stated, in accordance with certain aspects of the invention, a precision instrument is provided for measuring lineal displacements with a measuring anvil which is arranged so that it can be adjustably displaced with true straight line motion. The measuring anvil produces displacements which are readily related to input displacements to be measured by virtue of a contact pad surface on one end which is directly accessible, for example, to an indicating gage sensor. A precision linkage producing the straight line motion is provided by a drum-like supporting structure in which a pair of spaced diaphragms support the measuring anvil at their centers. An interferometer element such as an optical flat is fixed to the measuring anvil so that motion of the anvil is readily measured in respect to a reference light wavelength. This measurement is made by an interferometer comprised of a second optical flat forming an air wedge with the first flat, a monochromatic light source forming an interference pattern with the flats, and a viewing telescope through which interference bands can be counted whereby the displacement of the measuring anvil is compared to the light wavelength standard. With the exception of the non-critical viewing telescope, all the interferometer elements are arranged along a single axis and they are adapted to cooperate in such a manner that the interferometer operation is not dependent on structural stability of the instrument frame, as long as the frame maintains the wedge angle constant between the optical flats during each measurement run.

The invention, together with further objects and advantages thereof, may best be understood by referring to the following description taken in conjunction with the appended drawings in which like numerals indicate like parts and in which.

Figure 1:
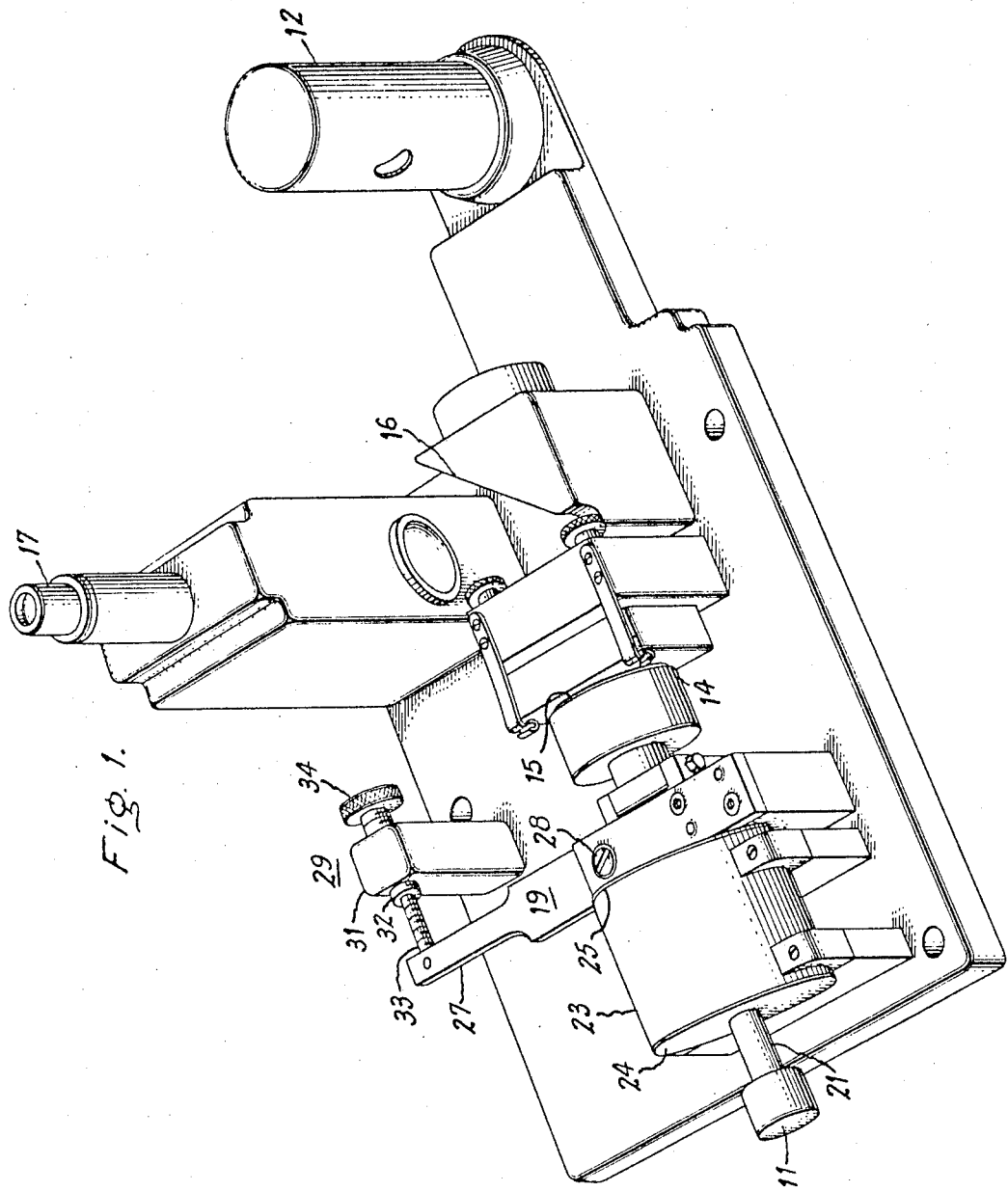
FIGURE 1 is a perspective view of the interferometer measuring instrument.
Figure 2:
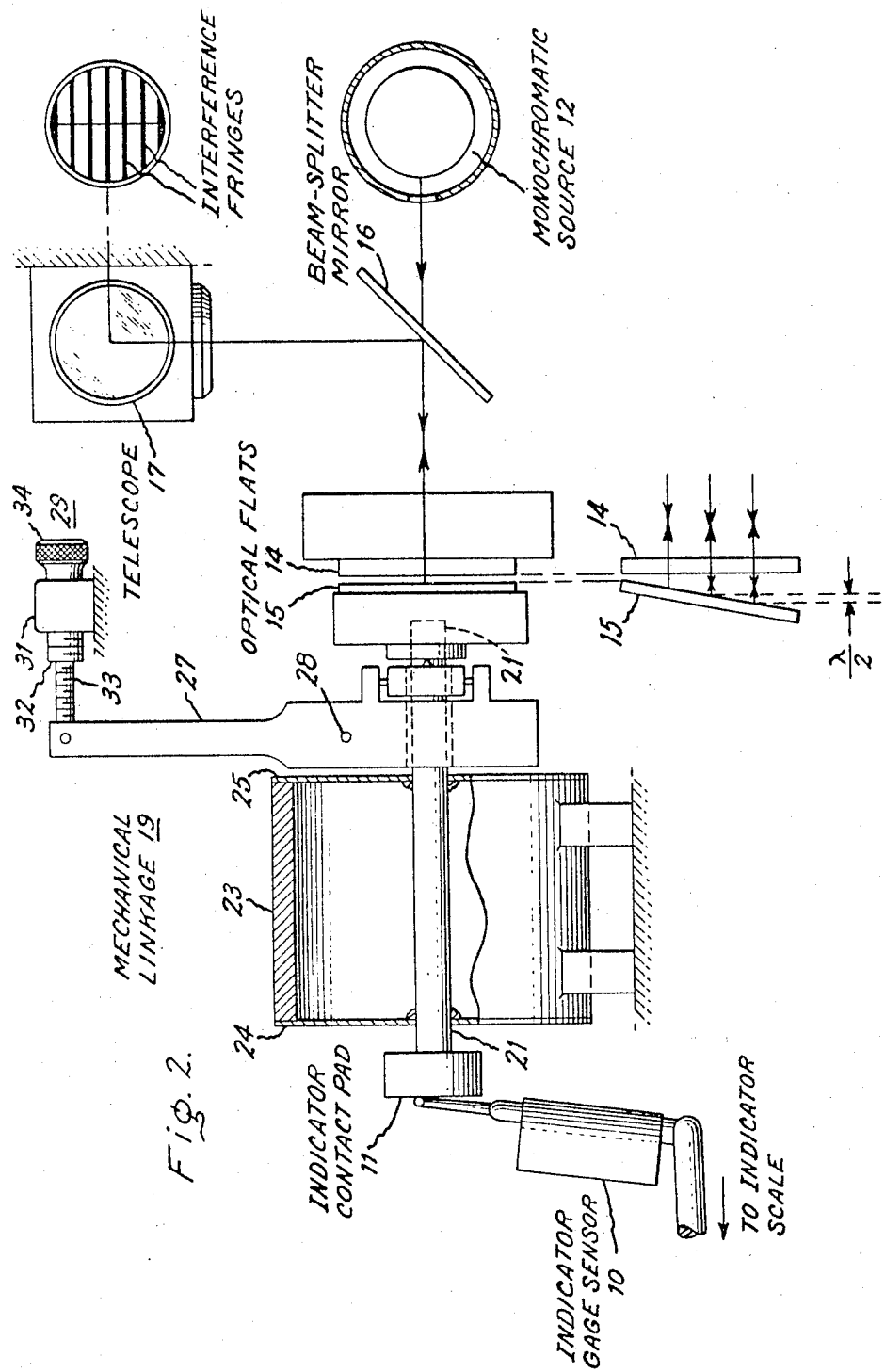
FIGURE 2 is a schematic illustration of the relationships between the components of the FIGURE 1 instrument.

In FIGURES 1 and 2, an indicator pad 11 provides a contact surface which is displaced by readily controlled and measurable amounts. This enables precise comparison between the readings on an indicating gage having a sensor 10 placed against the contact pad 11 and the wavelength of a standard monochromatic light source 12. The indicator pad 11 is part of a measuring anvil which forms an intermediary between the unit being calibrated and the light wavelength reference. Comparison is made by an interferometer including a pair of optical flats 14 and 15, a beam splitting mirror 16 and a viewing elbow telescope 17. One optical flat 15 is secured to contact pad 11 by means of a connecting shaft 21 so that the pad 11 and shaft 21 form the measuring anvil having an interferometer element, flat 15, mounted thereon. A mechanical linkage 19 is coupled to shaft 21 to produce axial displacement of contact pad 11 and optical flat 15. Optical flat 14 is fixed so that monochromatic light from source 12 produces a parallel fringe pattern because of the air wedge separating the optical flats. The displacement of the optical flat 15 causes the fringe pattern to be proportionately moved as a function of the light wavelength and the change in air wedge thickness. The resulting fringe pattern motion is observed by means of the telescope 17 and the beam-splitting mirror 16.

The support of the anvil shaft 21, upon which contact pad 11 and optical flat 15 are mounted, is a critical function. The axial displacements of contact pad 11 produce corresponding expansion and contraction of the air wedge between the optical flats 14, 15. Any pivoting of shaft 21 about any axis perpendicular to the shaft will cause serious error in the observed fringe pattern. The supporting structure (FIGURE 2) comprised of diaphragms 24 and 25 provides the support. These diaphragms are brazed to shaft 21, which passes through their centers, and are brazed at their outer edges to a rigid cylinder 23 fixed to the instrument base 9. The diaphragms provide a rugged precision mechanical linkage which constrains the anvil shaft 21 to reciprocate axially with true straight line motion. While some transverse motion is permissible, maintaining the surfaces of contact pad 11 and optical flat 15 perpendicular to the direction along which the lineal measurements are being made is essential.

The motion of shaft 21 and hence contact pad 11 is controlled by the mechanical linkage 19 in which a lever 27 is pivoted at 28 to the instrument base. At one end lever 27 is pivotally coupled to shaft 21 and at the other end it is coupled to the base for fine manual adjustment by a double screw assembly 29. Rod 33, pivoted to lever 27, is threaded within a hollow adjustment shaft 32. Post 31, mounted on instrument base 9, has the adjustment shaft 32 threaded therethrough. When the knob 34 on adjustment shaft 32 is rotated, the rod 33 and lever 27 are displaced because of a difference in thread ratios between the inner and outer threads. With pivot 28 placed near anvil shaft 21, an adjustment factor of 100 microinches per full turn of knob 34 is readily obtained. (For example, thread ratios of 48 and 49 threads per inch with lever arm ratios of 4:1 are satisfactory.)

The component parts of the interferometer are essentially conventional. A standard cadmium source is preferred for the monochromatic light source 12 because of its green spectral line having a wavelength of 20.0 microinches. Optical flats 14 and 15 are conveniently standard quartz plates having surfaces finished to optical flatness. Because flat 15 serves only as a mirror, light efficiency is enhanced by coating it with a reflective material such as aluminum. The light rays from source 12 are partly reflected by the first surface of optical flat 14 and partly reflected by the first surface of optical flat 15. This produces an interference pattern of parallel light and dark bands. The flats are not perfectly parallel so that there in face is a wedge shaped air space between them. This causes the parallel band pattern in the combined reflected light. The number of lines produced in the pattern is proportional to the wedge slope, the line density being optional. The band pattern is observed through an eyepiece of telescope 17 having crosshairs, by means of the beam-splitting mirror 16 (partially transparent to pass the light from source 12 to the optical flats 14, 15). When the crosshairs are aligned with the fringe pattern, one point or line in the pattern is observed. As optical flat 15 is moved, the bands will appear to move. At any one point, the total light will vary cyclically as the flat 15 is displaced. For a displacement of one half wavelength or 10 microinches, a dark point will gradually change from dark through light to dark again. Since this is accompanied by a shift of the pattern by the distance between bands, displacement of the optical flat 15 and contact pad 11 is measurable by counting and interpolating between bands, and this reference displacement is readily compared with the reading on the indicating gage being calibrated or some other object being measured.

The essentially single-axis arrangement of all optical and mechanical components of the instrument eliminates or makes insignificant many possible sources of possible error. For example, the interference theoretically relies on parallel light rays for a linear pattern. But collimation of light source 12 is unnecessary because only the center of the interference pattern is actually observed, where the rays are essentially axial. The portions away from the pattern center are used essentially as guides to observing the center point for which they are very useful. Because of these considerations, the accuracy of telescope 17 is not critical and can contribute no significant error as long as its crosshairs are aligned with the pattern center. Also, the long term dimensional stability is not of importance in most respects. That is, elements such as anvil shaft 21 can expand and contract without effect, as long as they remain stable during any one measurement run.

While the preferred embodiment illustrated is intended for calibrating indicating gages, it is evident that it provides a measuring instrument which is adapted to measure lineal microinch displacements generally. Its operation also inherently generates mechanical displacements of an instrument surface directly referenced to a wavelength standard.

Modifications of the illustrated embodiment include the substitution of a photoelectric counter for the viewing telescope 17, where the additional complexity is justified by the automatic operation. Also, different interferometer configurations can be employed, such as the Michelson interferometer, but this sacrifices axial symmetry and the directly useful parallel fringe pattern.

The drum structure 21, 23–25 is preferably preformed together with anvil shaft 21 before turning down the surfaces of diaphragms 24 and 25. With beryllium-copper alloy for the diaphragms and steel for cylinder 23 these parts are joined by brazing. By using sheets of about a quarter inch in thickness, wrinkling of the diaphragms is avoided during brazing. Shaft 21 is aligned coaxially with drum cylinder 23 with sufficient accuracy by standard precision drilling of the drum followed by press fitting shaft 21 and then brazing the anvil shaft to the diaphragms 24 and 25. To obtain a suitable diaphragm thickness of 0.005 inch, the drum is first filled with a low melting temperature alloy to provide rigidity and then turned down. To avoid the risk of puncturing diaphragms 24 and 25, the last part of reducing the diaphragm thickness can be done electrochemically. In connection with the aforementioned alignment accuracy, it should be noted that the desired function is to provide the equivalent of a parallel bar linkage. If the axis of anvil shaft 21 is skewed relative to the axis of cylinder 23, this is immaterial if the skew angle remains constant with anvil displacement. In practice, it has been found sufficient to provide standard precision square cuts for cylinder 23 and subsequently to align the surfaces of contact pad 11 and optical flat 15 with the resulting cylinder end faces. With this arrangement, a measuring anvil travel of 2000 microinches is permitted without endangering the elasticity of the diaphragms.

For repeatability and long life, the diaphragms 24 and 25 should not be stressed beyond their yield strength. The diaphragms are circular flat plates, firmly secured completely around the outer edge with a load uniformly distributed on the edge of a concentric hole. The concentric hole edge is not free to rotate; i.e., the slope of the diaphragm at this edge is not free to change, but the edge is free to move in a direction normal to the diaphragm plane. It has been found that the design of the diaphragms 24 and 25 can be in accordance with standard engineering practice in respect to the selection of dimensions. For example, using brass as the diaphragm material, a displacement range of two thousand microinches is conservatively allowed for with a diaphragm diameter of two inches and a thickness of ten thousandths of an inch. This results in a maximum stress of approximately twenty-seven hundred p.s.i. which is half of the yield strength of brass.

While a particular preferred embodiment of the invention has been shown and described herein, it is not intended that the invention be limited to such disclosure. Changes, such as the modification of the measuring anvil support structure to permit angular displacements instead of lineal displacements through the use of diaphragms to avoid erroneous displacements, are incorporated within the scope of the claims.

What is claimed is:

1. A microinterferometer linear measurement device comprising:
   (a) a rigid instrument base;
   (b) a rigid right cylindrical shell affixed to said base;
   (c) a plurality of tensibly elastic, resilient diaphragms fixed to said shell along the perimeter thereof in parallel spaced relationship normal to the axis of said cylindrical shell;
   (d) an elongated rigid anvil shaft extending through and being affixed to said diaphragms at the centers thereof and extending axially of said shell whereby said shaft is suspended for and limited to linear motion in the direction of its length by the elasticity and resiliency of said diaphragms;
   (e) an adjustment mechanism pivotally supported from said base and pivotally coupled to said shaft for selectively holding and linearly displacing said shaft;
   (f) a contact pad attached to one end of said shaft, said pad having a contact surface normal to the length of said shaft to cause said surface to move as said shaft moves;
   (g) a first optical flat attached to the other end of said shaft for movement with said shaft, said flat having an optically flat reflecting surface substantially normal to said shaft;
   (h) a second optical flat supported from said base, said second flat having an optically flat surface in close face to face nearly parallel angular relationship with the reflecting surface of said first flat to cause an interference phenomenon fringe when the flats are properly illuminated;
   (i) illumination means for impinging substantially parallel rays of monochromatic light through said second flat on to said reflecting surface whereby said light reflects back through said second flat and causes said interference pattern at the face of said second flat; and
   (j) means for sensing said pattern and movement of fringes within that pattern caused by movement of said first flat, said means for sensing including a reference whereby the amount of movement of said fringes with respect to said reference constitutes a measurement of the amount of movement of said shaft.

2. An instrument for precision measurement of small linear distances comprising:
   (a) an instrument base;
   (b) an elongated measuring anvil;
   (c) interferometer means including two flat optical surfaces separated by a narrow air wedge, means for illuminating said surfaces with substantially parallel monochromatic light rays to cause an interference pattern and means through which said interference pattern and changes therein can be observed, one said surface being attached to said anvil, the other said surface being attached to said base; and
   (d) means attaching said anvil to said base permitting longitudinal displacement of said anvil including:
      (1) a hollow drum having a relatively nondeformable cylindrical casing fixed to said base and elastic, resilient drum heads, said anvil extending through and being attached to said heads axially of said drum; and
      (2) drive means attached to said base and contacting a portion of said anvil for imparting a force to said anvil longitudinally thereof to displace said anvil to cause change in the width of said air wedge;
   (e) said anvil also having a contact pad substantially normal to the direction of displacement of said anvil for application to moving part of another instrument; whereby movement of said drive means causes a change of width of said air wedge in turn causing an observable shift in said interference pattern whereby said shift can be used to measure the amount of displacement of said anvil.

3. An instrument for precision measurement of small linear distances comprising:
   (a) an instrument base;
   (b) an elongated measuring anvil;
   (c) means displaceably attaching said anvil to said base for controlled displacement of the anvil limited to the direction of the length of said anvil including mounting means and adjusting means;
   (d) interferometer means including two flat optical surfaces located proximate to each other in face to face nearly parallel relationship with one surface being mounted in a retaining means attached to one end of said anvil for displacement therewith and the other attached to said base to fix its position whereby displacement of said anvil causes a change of distance between said optical surfaces;
   (e) means for producing and delivering substantially parallel rays of monochromatic light to said interferometer means to cause said optical surfaces to produce an interference pattern;
   (f) sensing means to permit observation of said interference pattern and changes in said pattern caused by displacement of said anvil and said surface whereby the amount of said displacement can be measured by said changes;
   (g) said mounting means including a rigid cylindrical shell fixed to said base surrounding, spaced from and axially aligned with said elongated measuring anvil and a plurality of spaced, substantially parallel elastic, resilient diaphragms fixed normally both to said shell along the perimeter thereof and to said anvil, whereby motion of said anvil with respect to said shell and said base is limited to linear motion; and
   (h) said adjusting means including mechanical means movably attached to said base, drive means to move said mechanical means relative to said base and pivotal coupling means attached to said mechanical means and bearing against said retaining means for causing said retaining means and said anvil to displace responsive to movement of said adjusting means and for permitting pivotal motion between said mechanical means and said anvil.

4. An instrument for precision measurement of small linear distances comprising:
   (a) an instrument base;

(b) an elongated measuring anvil;
(c) means displaceably attaching said anvil to said base for controlled displacement of the anvil limited to the direction of the length of said anvil including mounting means and adjusting means;
(d) interferometer means including:
  (1) two flat optical surfaces located proximate to each other in face to face relationship with one surface being mounted in a retaining means attached to one end of said anvil for displacement therewith and the other attached to said base to fix its position whereby displacement of said anvil causes a change of distance between said optical surfaces;
  (2) means for delivering substantially parallel rays of monochromatic light to said interferometer means to cause said optical surfaces to produce an interference pattern;
  (3) sensing means to permit observation of said interference pattern and changes in said pattern caused by displacement of said anvil and said surface whereby the amount of said displacement can be measured by said changes;
(e) said mounting means including a rigid cylindrical shell surrounding said elongated measuring anvil in spaced relation thereto fixedly mounted on said base and a plurality of spaced, substantially parallel, elastic, resilient diaphragms fixed both to said shell along the perimeter thereof and to said anvil, whereby motion of said anvil with respect to said shell and said base is limited to linear motion axially of said anvil and said shell; and
(f) said adjusting means including mechanical means movably attached to said base, drive means to move said mechanical means and pivotal means coupling said retaining means and said anvil for causing said one surface and said anvil to displace responsive to movement of said adjusting means.

References Cited

UNITED STATES PATENTS

| | | | |
|---|---|---|---|
| 2,815,452 | 12/1957 | Mertz | 88—14 |
| 2,848,921 | 8/1958 | Koulikovitch | 88—14 |
| 3,045,535 | 6/1962 | Jacquinot | 88—14 |
| 3,224,323 | 12/1965 | Chitayat | 88—14 |

OTHER REFERENCES

Twyman, Prism and Lens Making, 1952, pp. 388–389, QC 385 T88.

JEWELL H. PEDERSEN, *Primary Examiner.*

B. J. LACOMIS, *Assistant Examiner.*